United States Patent [19]
Tantlinger

[11] 3,992,846
[45] Nov. 23, 1976

[54] COMPOUND FILLED KEY INTERLOCK JOINT

[75] Inventor: Keith W. Tantlinger, Coronado, Calif.

[73] Assignee: Rohr Industries, Inc., Chula Vista, Calif.

[22] Filed: July 10, 1975

[21] Appl. No.: 594,828

Related U.S. Application Data

[63] Continuation of Ser. No. 453,378, March 21, 1974.

[52] U.S. Cl. ................................ 52/588; 52/758 D; 403/364
[51] Int. Cl.² ...................... E04C 1/30; F16B 11/00
[58] Field of Search ........... 52/588, 758 D; 403/364

[56] References Cited
UNITED STATES PATENTS

| | | | |
|---|---|---|---|
| 2,786,556 | 3/1957 | Constance | 52/588 |
| 3,156,210 | 11/1964 | Lyon | 403/364 |
| 3,590,545 | 7/1971 | Webb | 52/588 |
| 3,708,938 | 1/1973 | Tantlinger | 52/588 |
| 3,813,839 | 6/1974 | Simpson et al. | 52/588 |
| 3,823,525 | 7/1974 | Bruun | 52/758 D |

*Primary Examiner*—James L. Ridgill, Jr.
*Attorney, Agent, or Firm*—Patrick J. Schlesinger

[57] ABSTRACT

A plurality of at least two plate or panel-type members are formed with edge portions which hook together to define a key-forming passage therebetween, with tongue-and-groove type interlocks directed laterally from the elements defining both sides of the passage. The passage is filled with initially flowable, solidified key-forming material injected therein under pressure sufficient to cause the injected material to flow along and fill all, or one or more selected portions of the passage. The elements of the panels defining such passage are so formed that the pressurized, injected material tends to expand the passage, and thereby urge adjacent edges of the two panels toward abutting relation with each other, whereby further expansion of the passage is prevented. Upon solidifying, the injected material comprises a key, which interlocks the panels and seals the joint therebetween.

15 Claims, 5 Drawing Figures

3,992,846

COMPOUND FILLED KEY INTERLOCK JOINT

This is a continuation of application Ser. No. 453,378, filed Mar. 21, 1974.

BACKGROUND OF THE INVENTION

In the past, in the joining together in edge-to-edge relation formed or extruded panel-type members, for example, aluminum strakes used to cover the side walls of a transportation type vehicle such as a bus or rail car, it has been common practice to form adjoining edge portions of the strakes for overlapping engagement with each other, and then to secure the overlapped edge portions together with a row of rivets. A groove usually is provided to receive the heads of each row of rivets, and after the rivets are set, each such groove is filled with suitable material such as a mastic screeded in, or a strip set in the groove to cover and conceal the rivet heads.

Such prior strake joints are somewhat costly, involve a substantial amount of labor, and are not readily concealed. They usually are so designed that the filled material of each groove forms a decorative groove of stripe along the side of the vehicle. This filler material is subject to damage or removal of vandals.

The use of solidifiable liquid or plastic material has been employed previously in various types of interlocked joints, for example, as shown in U.S. Pat. Nos. 2,266,702, 3,823,525, 3,118,252 and 3,151,767. Such prior joint structures do not, however, provide a strong, plastic key-interlock joint similar, in concept or structure to the present invention; surface conformation of the present joint.

SUMMARY OF THE INVENTION

A primary objective of the present invention is to provide a key-interlock joint for joining together the edges of two adjacent plate or panel-type members wherein solidificable, initially flowable, key-forming material is injected into a selected portion or portions of a passage defined by interengaged portions of the two joined members, the joint thus provided being strong, weather-tight, dust free, stable rattle-free and inconspicuous, and which washes out, instead of accumulating, tolerances of the individual components.

A further objective of the invnetion is to form adjoining edge portions of two side-by-side panel-type members for interlocking with each other when mounted to a suitable support, the inter-engaged portions defining a passage therebetween, and to inject into such passage solidifiable, initially flowable material under pressure high enough to force the injected material a required distance along the passage, the pressure of the injected material tending to fill and expand the passage to a degree limited by the formation of the panel members, and to extrude such material into interstices between portions of the members defining such passage, whereby, upon solidifying, the injected material acts as a key, locking the panels together by a sealed joint which resists forces acting between the members in tension, in shear, and in compression across the joint.

While the invention as illustrated and described herein is intended to join the plate portions of adjacent vehicle side wall strakes, it an of course be used to join other panel-type members, or even major assemblies, such as vehicle roof-to-side wall side wall-to-floor, etc.

As used herein the terms "outer" and "inner" and "outwardly" and "inwardly" are used to indicate directions normal to the common outer surface of the joined plate members, while "laterally outward(ly)" and "laterally inward(ly)" are used to indicate directions laterally across the joint relative to the plate member of which an element referred to is a part.

DESCRIPTION OF THE DRAWINGS

The objectives and advantages of the invention will be apparent from the following description and the accompanying drawings, wherein.

DETAILED DESCRIPTION

Figure 1:
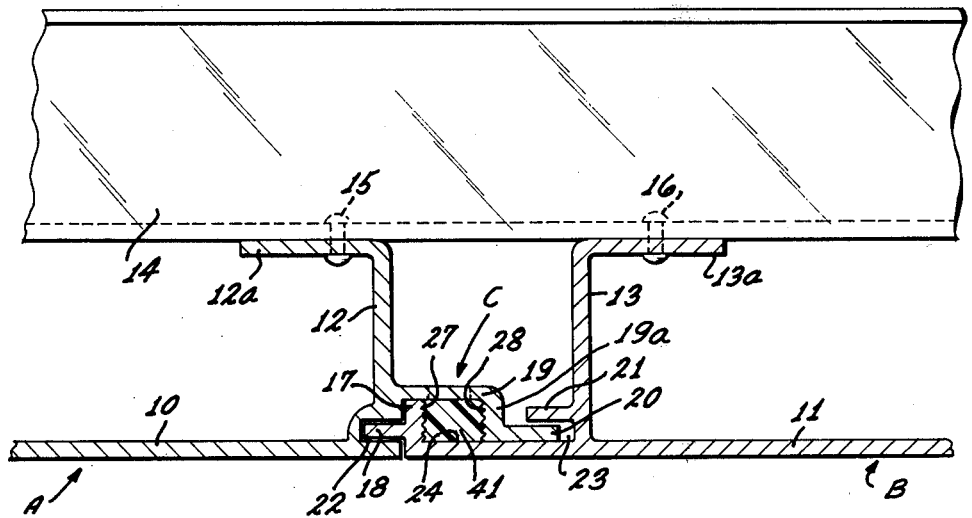
FIG. 1 is a fragmentary, transverse, sectional view showing marginal portions of a pair of vehicle side walls strakes mounted in edge-to-edge relation on a support member, and joined together in a position of final assembly by a presently preferred form of joint structure embodying the present invention.
Figure 1A:
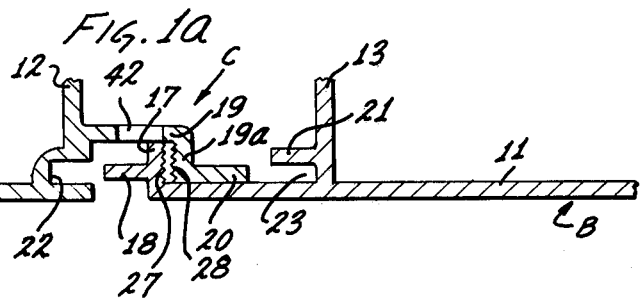
FIG. 1a is a similar view of the joint structure shown in FIG. 1 with the parts in a position of initial assembly.

Referring to the drawings in detail, and considering first a presently preferred form of the invention shown in FIGS. 1 and 1a, two plate or panel-type members A and B are herein assumed to be adjacent strakes covering a side wall of a transportation type vehicle such as a bus or rail car. The strakes A and B comprise outer plate portions 10 and 11, respectively, shaped to define a common outer surface and thereby provide a desired external side wall configuration for the vehicle of which they are part, and a selected plurality of integral, inwardly extending, supporting flanges 12 and 13. The inner edge portions 12a and 13a, respectively, of the support flanges 12 and 13 are bent to seat on a selected number of usual upright support members, such as mullion 14, to which they are fastened by conventional fastening means such as rivets 15 and 16 respectively.

The strakes A and B are joined in edgewise adjacent relation by a joint C embodying the present invention. This joint comprises an inwardly extending flange 17 formed integrally along the joined edge of the plate portion 11 of the panel A. An integral locking flange 18 extends laterally outwardly from the flange 17 and fits into a groove 22 of corresponding shape and size provided in a thickened base portion of the support flange 12 of the other strake A. An integral flange 19 also extends laterally outwardly from the support flange 12 of the strake A inwardly of the groove 22 therein, the tion 19a and a laterally outwardly extending locking flange 20 which fits into a space 23 provided between a flange 21 on the support flange 13 and the outer plate portion 11 of the strake B.

The flanges 18 and 20 are sufficiently short to permit the joint elements to be easily placed in their initially assembled position as shown in FIG. 1a by superimposing the edge portion of the strake A on that of the strake B when spaced slightly apart from their finally assembled position shown in FIG. 1.

After initial assembly of the strakes as shown in FIG. 1a, the panels are moved edgewise together into edge-to-edge fitted relation, thereby to cause the flange 17 to abut the edge of the outer plate portion 10, thereby preventing further movement of the strakes in this direction and positioning the parts of the joint in interlocked interengagement as shown in FIG. 1. Completion of this final movement of assembly opens a key-forming passage 24, which is defined by the flanges 11, 19, and 19a, and a portion of the plate portion 11. In order to complete the joint, initially flowable, solidifiable, key-forming material 41, which may be either a suitable plastic or liquid of selected viscosity, is then injected into the passage 24 under selected pressure sufficient to cause a desired flow of the material along the passage 24, and, if desired, also into communicating interstices between the parts. Such latter flow is controlled by the amount of pressure on the material and the amount of clearance between the parts.

The term "solidifiable" as applied to the key-forming material 41 is intended to mean either self-solidifying or solidifiable by heat or other treatment after injection into the passage 24. Also, this material is so selected that when solidified it is of required strength but may vary in consistency from a strong, hard material such as "Hydrastone" sold by U.S. Gypsum Company, to a soft, resilient material such as rubber or a rubber-like substance or other suitable material depending upon the intended use of the joint and the stresses it is designed to withstand in service. The key-forming material also may have adhesive or bonding capability, such as, for example, an epoxy resin. Preferably it is of material which does not shrink upon hardening.

The strakes A and B may be of substantial length, for example, up to and even exceeding 70 feet in length. The key-forming material 41 may be injected into the passage 24 from either or both ends thereof or from a plurality of selectively spaced holes 42 provided as shown in FIG. 1a and in broken lines in FIG. 1. After the injected key-forming material has solidified, the holes, may, if desired, be closed as by means of flush plugs, not shown, of suitable material. The holes 42, where provided, serve not only as witness holes to indicate the presence or absence of material in the passage 24, but also to provide additional resistance to longitudinal shear. Various types of extruding apparatus suitable for injecting the key-forming material 41 into the passage 24 are either well known and readily available, or are capable of being designed and built by an ordinarily capable designer or artisan familiar with such practice. The details thereof are, therefore, omitted.

OPERATION OF THE FORM OF THE INVENTION SHOWN IN FIG. 1

In practicing the form of the invention shown in FIG. 1 and 1a, after necessary side wall support or frame members, such as the mullion 14, are erected, either as parts of a vehicle frame structure or jig, at least one of the strakes, such as the strakes A, is secured to the support structure as by the rivets 15. If the structure is being erected with the mullion 14 upright, after the strake A is thus mounted, the edge portion of the upper strake B may be superposed in hooked relation with the flange 19 of the lower strake A as shown in FIG. 1a, so that upon release of the angle upper strake B the latter will drop by gravity to final assembled position as shown in FIG. 1. The rivets 16 may be inserted and set to secure the strake B to the mullion 14 with the parts in their final position of assembly shown in FIG. 1.

Selected hardenable key-forming material 41 is injected into the passage 24 under selected pressure to fill all, or one or more selected portions of the passage and communicating interstices between the parts, and hardened. In the event that any of the key-forming material 41 seeps through to the outer faces of the strakes it can be readily cleaned off by known means either before or after solidifying, as desired.

DESCRIPTION OF FIGS. 2, 3 AND 4

Figure 2:
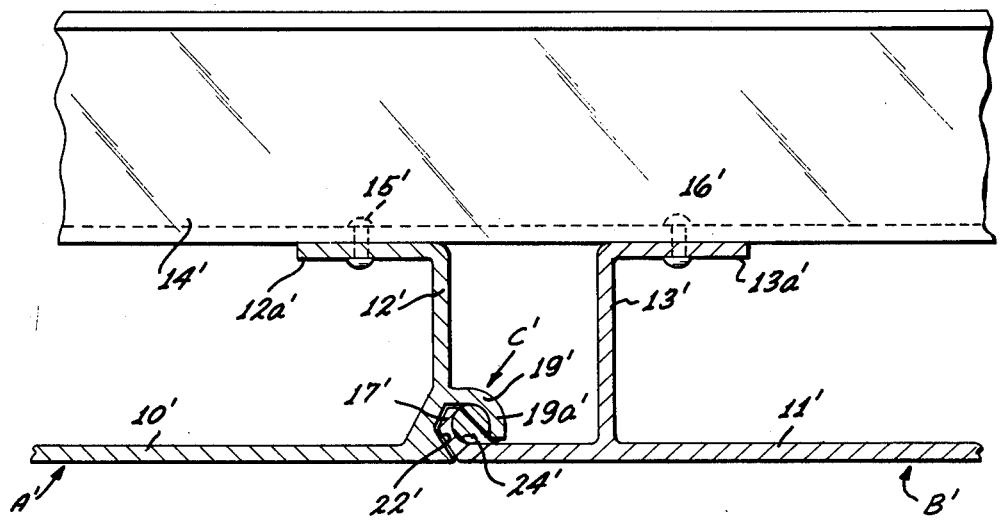
FIGS. 2, 3 and 4 are views generally similar to FIG. 1 and show modified forms of the invention.
Figure 3:
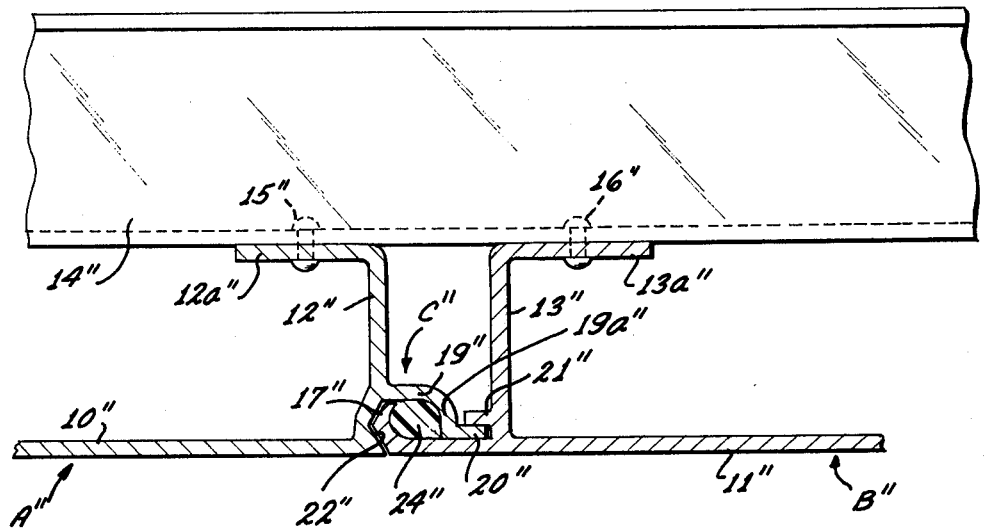
Figure 4:
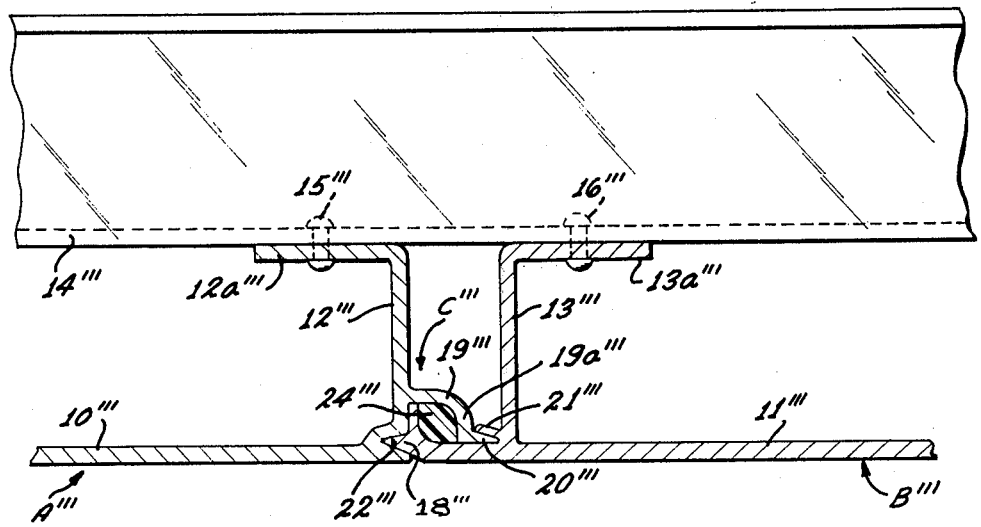

In the modified forms of the invention shown in FIGS. 2, 3 and 4, many of the various parts are generally quite similar to those of FIGS. 1 and 1a. Corresponding parts shown in FIGS. 2, 3 and 4 are, therefore, designated by the same reference numerals as their respective counterparts in FIGS. 1 and 1a, with the exception that in FIG. 2, a prime (') will be added thereto, in FIG. 3, a double prime (''), and in FIG. 4, a triple prime (''').

In the form of the invention shown in FIG. 2, the joint C' comprises an inwardly extending curved flange 17' formed integrally on the laterally outward edge of the outer plate portion 11' of the strakes B'. A second laterally outwardly extending flange 19' is formed integrally on the support flange 12' of the strake A' and has an outwardly bent portion 19a'. The convex, laterally outward side of the flange 17' is generally wedge shape in cross section and fits into a corresponding shaped recess 22' formed in the base portion of the mounting flange 12' outwardly beyond the base of the flange 19'.

In the form of the invention shown in FIG. 3, the wedge shape side of the flange 17'' fits into a correspondingly shaped recess 22'' as in FIG. 2 and a locking flange 20'' extends laterally outwardly from the free edge of the flange poortion 19a'' and fits beneath a flange 21'' which extends from the support flange 13'' as in FIG. 1 to resist shear stresses applied across the joint. In the form of the invention shown in FIG. 4, a tapered flange 18''' fits into a recess 22''' of corresponding shape and size provided at the base of the support flange 12''' while the flange portion 19a''' is provided with an outwardly projecting tapered flange 20''' which fits beneath a flange 21'''' provided on the support flange 13''' in a manner generally similar to the showing of FIG. 1.

The operation of the forms of the invention shown in FIGS. 2, 3 and 4 will be obvious to one familiar with their structure as explained herein and having an understanding of the form of the invention shown in FIGS. 1 and 1a.

The invention provides a strong, inexpensive, easily assembled, permanent, weather tight and inconspicuous joint for interconnecting adjoining edges of the side wall strakes of transportation type vehicles and other types of panel-like members for use in various structures, such as buildings, marine vessels, cargo pellets, and others. The joint has an additional feature which is advantageous from a cost standpoint in that it omits the substantial labor and equipment costs involved in punching the holes, setting the rivets, and covering the heads of each row of rivets in a riveted joint.

Having thus described the invention, what is claimed as new and useful and desired to be secured by U.S. Letters Patent is:

1. A compound filled, key interlock joint joining in edge-to-edge, interlocked relation two relatively thin, solid, extruded aluminum plate members, said joint comprising:
   an inwardly extending flange integral with and extending along the joined edge portion of one of said plate members;
   means integral with, and defining an outwardly open channel along,, the joined edge of the other of said plate members, said channel defining means being located inwardly of, and underlying an inner surface portion of, said one plate member, said inwardly extending flange extending into such channel, with the free edge of the inwardly extending flange closely adjacent the bottom of such channel, the means defining the laterally outward side of such channel terminating closely adjacent such inner surface portion of said one plate member, thereby defining, between said inwardly extending flange and the laterally outward side of the channel, a substantially closed passage, which passage is located inwardly of such inner surface portion and is expanded laterally upon movement of the plate members edgewise toward each other to move the inwardly extending flange toward the laterally inward side of the channel, and which passage is contracted by a reverse, separative movement of the two plate members, a first shear resisting locking flange on the laterally outwardly directed side of said inwardly extending flange, said first projection being seated in fitted relation in a correspondingly shaped recess provided therefor in the laterally inward side of such channel when the plate members are moved laterally toward each other to expand such passage laterally to its maximum size, a second shear resisting locking flange on the laterally outward side of such channel, said second projection being seated in fitted relation in a correspondingly shaped recess provided therefor in said one plate member when the plate members are moved laterally toward each other to expand such passage laterally to its maximum size, and a quantity of flowable, hardenable, key forming compound injected under selected pressure into such passage, when the latter is so expanded, to fill at least a selected portion thereof, and hardened, thereby to prevent lateral contraction of such passage and to retain the first and second locking projection in their respective recesses.

2. A compound filled key interlock joint as claimed in claim 1 wherein, with the inwardly extending flange inserted in such channel, and the plate members moved laterally apart to reduce such passage laterally to its minimum size, both of said locking flanges are withdrawn clear of their respective recesses, thereby freeing said one plate member for outward movement relative to and clear of said other plate member.

3. A compound filled, key interlock joint as claimed in claim 1 wherein the plate element defining the laterally inward side of such channel includes at least a portion of the adjoining edge of said one plate member.

4. A compound filled, key interlock joint as claimed in claim 1 wherein the laterally outward side of the inwardly extending flange is co-extensive with the adjoining edge of said other plate member.

5. A compound filled key interlock joint as claimed in claim 1 wherein, when the two plate members are in edge-to-edge fitted relation, the first and the second locking flange are inserted in their respective recesses to a depth not greater than than the maximum lateral movement of the inturned free edge portion within such channel upon a direct, lateral separative movement of the two plate members.

6. A compound filled, key interlock joint as claimed in claim 1 wherein each of the first and second locking flanges is tapered outwardly toward its free edge, and the groove for the first locking tongue and the recess for the second locking tongue are, respectively, of a size and shape corresponding to their respective locking flanges, whereby the locking flanges are freely insertable into their respectiive groove and recess, and fit snugly therein when the two plate members are moved laterally together into edge-to-edge fitted relation.

7. A compound filled, key interlock joint as claimed in claim 1 wherein at least one of the locking flanges is generally rectangular in cross sectional shape, and the sides of said at least one locking flange are parallel to the direction of relative movement of the two plate members when the latter are moved laterally between edge-to-edge fitted relation with each other, and laterally separated condition.

8. A compound filled, key interlock joint connecting, in edge-to-edge fitted relation, adjoining side edges of the relatively thin, solid outer plate portions of two elongate, extruded, aluminum strakes, each of which strakes comprises such outer plate portion and a plurality of support flanges extending along the inner face of said each outer plate portion, the free edges of said support flanges being attached to a supporting framework, said joint structure comprising:

a thickened base portion of a support flange adjacent the adjoining edge of one of said plate portions, said flange base portion comprising one wall of a channel and having a groove lengthwise therein, an angle flange integral with, and extending laterally outwardly from, said first flange portion inwardly of the groove therein, said angle flange defining, with said first flange portion, an outwardly open channel, the free edge of said angle flange being directed outwardly underlying and terminating closely adjacent the inner surface of the other plate portion, a first locking flange integral with and extending laterally outwardly from the free edge of the angle flange and closely underlying the inner surface of said other plate portion, a recess-defining flange spaced from the inner side of the other plate portion and located to receive said first locking tongue in fitted relation in the recess between said recess-defining flange and the other plate portion when the two plate portions are moved together into edge-to-edge fitted relation, an inturned flange along the adjoining edge of said other plate portion, said inturned flange extending into, and terminating close to the bottom of the channel defined by said first and angle flanges, and defining a closed passage, which passage is widened by movement of the plate portions edgewise toward each other, and is narrowed by lateral separtive movement of the plate portions, a second locking flange integral with and extending laterally outwardly from the laterally outward side of the inturned flange and shaped and located for fitted entry into the groove in said first flange portion when the two plate portions are moved together into edge-to-edge fitted relation, and a quantity of flowable, hardenable plastic compound forced into such passage with the plate portions in edge-to-edge fitted relation, and hardened.

9. A plastic key interlock joint joining in flush, abutting relation, adjoining edges of two relatively thin, solid, plate portions of extruded aluminum, said joint comprising:

an outwardly open channel formed integrally along the adjoining edge of one of said plate portions, the element of said one plate portion which comprises the bottom of said channel being of a thickness of the order of that of the first plate portion and extending inwardly beyond the inner surface of the plate portion of which it is part, the laterally outward side of such channel underlying the inner surface of the adjoining edge of the other of said plate portions with the free edge of such laterally outward channel side closely adjacent such inner surface, the laterally inward side of said channel having a first locking recess therein, such first locking recess being located inwardly of said one plate portion, an inwardly extending flange formed integrally along the adjoining edge of said other plate portion and extending into said channel with its free edge closely adjacent the bottom of said channel, defining, with the bottom and laterally outward side of the channel, and such inner surface of said other plate portion, a closed, key-forming passage, a first locking flange integral with, and extending laterally outwardly from, said inwardly extending flange, said first locking flange being located inwardly of the plate portions and extending in interlocking relation into such first locking recess, means integral with said other plate portion defining a second locking recess located inwardly of the inner surface of said second plate portion, a second locking flange integral with and extending laterally outwardly from the laterally outward side of said channel, said second locking flange extending in interlocking relation into such second recess, and a quantity of flowable, hardenable key forming material injected into such passage, and hardened.

10. A plastic key interlock joint as claimed in claim 9 wherein the width of such passage, and the height of each of said locking flanges, are such that in the absence of key forming material in such passage, the two plate portions may be laterally separated a distance sufficient to withdraw both of said locking flanges clear of their respective locking recesses.

11. A compound filled, key interlock joint joining in edge-to-edge relation two relatively thin, solid, extruded aluminum plate members, said joint being substantially thicker than either of the plate members, and comprising:

an inwardly extending flange integral with, and extending inwardly of the joined edge portion of one of said plate members, an outwardly open channel integral with, and extending along, the joined edge portion of the other of said plate member, said channel underlying an inner surface portion of said one plate member, said channel comprising two laterally spaced apart channel walls and a channel bottom, said inwardly extending flange extending into such channel with the free edge of the inwardly extending flange closely adjacent the channel bottom, whereby such inner surface portion, the inwardly extending flange, the channel bottom, and the means defining the laterally outward channel wall define a closed passage, which passage is expanded upon relative movement of the two plate members edgewise toward each other, and is contracted by a reverse relative movement of the two plate members, a first, shear resisting, locking flange, of a thickness approximating that of each of the two plate members, integral with, and extending laterally from an intermediate portion of said inwardly extending flange, said first locking flange being seated in a corresponding shaped recess provided therefor in said other plate member upon a relative lateral edgewise movement of the plate members to expand such passage, a second locking flange integral with, and extending laterally from an intermediate portion of the laterally outermost of said channel walls, said second locking flange being seated in a correspondingly shaped recess provided therefor in said one plate member upon such relative movement of the two plate members to expand such passage, and a quantity of flowable, hardenable, key-forming compound injected under selected pressure into such passage when the later is expanded, thereby to fill at least a selected portion of such passage, and hardened.

12. A key interlock joint as claimed in claim 11, wherein the channel walls and bottom are each of a thickness corresponding substantially to that of the plate member with which they are integral.

13. A key interlock joint as claimed in claim 12, wherein at least one of the locking flanges is located inwardly of the plate member of which it is a part.

14. A key interlock joint as claimed in claim 11, wherein a major portion of the second locking flange is located inwardly of the second plate member.

15. A key interlock joint as claimed in claim 14, wherein both locking flanges are located inwardly of the inner surfaces of the members of which they are, respectively, part.

* * * * *